US009498770B2

(12) United States Patent
He et al.

(10) Patent No.: US 9,498,770 B2
(45) Date of Patent: Nov. 22, 2016

(54) CE-BASED COMPOSITE OXIDE CATALYST, PREPARATION METHOD AND APPLICATION THEREOF

(75) Inventors: Hong He, Beijing (CN); Wenpo Shan, Beijing (CN); Fudong Liu, Beijing (CN); Xiaoyan Shi, Beijing (CN); Changbin Zhang, Beijing (CN); Shaoxin Wang, Beijing (CN)

(73) Assignee: Research Center for Eco-Environmental Sciences, Chinese Academy of Sciences, Beijing (CN)

( * ) Notice: Subject to any disclaimer, the term of this patent is extended or adjusted under 35 U.S.C. 154(b) by 12 days.

(21) Appl. No.: 13/823,950

(22) PCT Filed: Nov. 9, 2011

(86) PCT No.: PCT/CN2011/081962
§ 371 (c)(1),
(2), (4) Date: Apr. 9, 2013

(87) PCT Pub. No.: WO2012/071971
PCT Pub. Date: Jun. 7, 2012

(65) Prior Publication Data
US 2013/0202513 A1    Aug. 8, 2013

(30) Foreign Application Priority Data

Dec. 1, 2010    (CN) .......................... 2010 1 0568133

(51) Int. Cl.

| B01J 21/00 | (2006.01) |
|---|---|
| B01J 23/00 | (2006.01) |
| B01J 25/00 | (2006.01) |
| B01J 29/00 | (2006.01) |
| B01J 23/10 | (2006.01) |
| B01J 23/83 | (2006.01) |
| B01D 53/94 | (2006.01) |
| B01D 53/56 | (2006.01) |
| B01J 23/28 | (2006.01) |
| B01J 23/30 | (2006.01) |
| B01J 37/03 | (2006.01) |
| B01J 23/881 | (2006.01) |
| B01J 23/888 | (2006.01) |
| B01J 35/04 | (2006.01) |
| B01J 37/00 | (2006.01) |

(52) U.S. Cl.
CPC .............. *B01J 23/83* (2013.01); *B01D 53/565* (2013.01); *B01D 53/9418* (2013.01); *B01J 23/002* (2013.01); *B01J 23/28* (2013.01); *B01J 23/30* (2013.01); *B01J 23/881* (2013.01); *B01J 23/888* (2013.01); *B01J 23/8885* (2013.01); *B01J 35/04* (2013.01); *B01J 37/0009* (2013.01); *B01J 37/031* (2013.01); *B01J 37/038* (2013.01); *B01D 2251/202* (2013.01); *B01D 2251/2062* (2013.01); *B01D 2255/2065* (2013.01); *B01D 2255/20738* (2013.01); *B01D 2255/20769* (2013.01); *B01D 2255/20776* (2013.01); *B01D 2255/40* (2013.01); *B01J 23/10* (2013.01); *B01J 2523/00* (2013.01); *Y02T 10/24* (2013.01)

(58) Field of Classification Search
USPC .......................... 502/303, 100, 300, 302, 304
See application file for complete search history.

(56) References Cited

U.S. PATENT DOCUMENTS

| 4,610,975 | A   | * | 9/1986 | Baker ...................... B01J 21/04 |
|---|---|---|---|---|
|           |     |   |        | 502/302 |
| 4,738,946 | A   | * | 4/1988 | Yamashita .............. B01D 53/86 |
|           |     |   |        | 502/302 |
| 5,866,498 | A   | * | 2/1999 | Chattha ................ B01D 53/945 |
|           |     |   |        | 423/213.5 |
| 8,222,461 | B2  | * | 7/2012 | Fischer .................. B01J 23/002 |
|           |     |   |        | 502/211 |
| 2008/0227628 | A1 | * | 9/2008 | Le Van Mao ............ B01J 20/18 |
|           |     |   |        | 502/62 |
| 2011/0176988 | A1 | * | 7/2011 | Okamura ........... B01D 53/8634 |
|           |     |   |        | 423/409 |
| 2011/0236282 | A1 | * | 9/2011 | Southward ............. B01J 21/066 |
|           |     |   |        | 423/239.1 |

FOREIGN PATENT DOCUMENTS

| CN | 1593752 A | 3/2005 |
|---|---|---|
| CN | 101204650 A | 6/2008 |
| CN | 101314127 A | 12/2008 |
| CN | 101507920 A | 8/2009 |
| CN | 101785994 A | 7/2010 |
| CN | 102000560 A | 4/2011 |

OTHER PUBLICATIONS

Alifanti et al., Studies in Surface Science and Catalysis 143, 2002, 337-344, as supplied by applicants.*
Alifanti, M., et al., "Preparation and characterization of WOx-CeO2 catalysts", "Studies in Surface Science and Catalysis", 2002, pp. 337-344, vol. 143.
Ma, Z., et al. , "Preparation of WO3/CeO2 Catalysts and Reaction Mechanism for Selective catalytic reduction of NO by NH3", "The Abstract Set of the 6th International Conference on Rare Earth Development and Application", Aug. 2, 2010, p. 162.
Wang, X., "Preparation and Characterization of Ce—Mo Complex Oxide", "Journal of Pingdingshan Teachers' College", May 2000, pp. 36-37, vol. 15, No. 2.

(Continued)

*Primary Examiner* — James McDonough
(74) *Attorney, Agent, or Firm* — Andrews Kurth Kenyon LLP; David Bradin

(57) ABSTRACT

Disclosed is a Ce-based composite oxide catalyst for selective catalytic reducing nitrogen oxides with ammonia, which comprises Ce oxide and at least one oxide of transition metal except Ce. The Ce-based composite oxide catalyst is prepared by a simple method which uses non-toxic and harmless raw materials, and it has the following advantages: high catalytic activity, and excellent selectivity for generating nitrogen etc. The catalyst can be applied in catalytic cleaning plant for nitrogen oxides from mobile and stationary sources.

16 Claims, No Drawings

(56) References Cited

OTHER PUBLICATIONS

Wang, X., "Preparation and Characterization of Ce—Mo Complex Oxide", "Journal of Pingdingshan Teachers' College", May 2000, pp. 36-37 (English Abstract), vol. 15, No. 2.

Cheng-Wen, L., "Dissertation on Preparation of Ce1-xFexO2 Mixed Oxides and Their Performance for Methane Combustion", Jun. 14, 2007, pp. I-VIII and 1-62.

Cheng-Wen, L., "Dissertation on Preparation of Ce1-xFexO2 Mixed Oxides and Their Performance for Methane Combustion", Jun. 14, 2007, pp. I-VIII and 1-62 (English Abstract).

\* cited by examiner

CE-BASED COMPOSITE OXIDE CATALYST, PREPARATION METHOD AND APPLICATION THEREOF

CROSS-REFERENCE TO RELATED APPLICATIONS

This application is a U.S. national phase under the provisions of 35 U.S.C. §371 of International Patent Application No. PCT/CN11/81962 filed Nov. 9, 2011, which in turn claims priority of Chinese Patent Application No. 201010568133.0 filed Dec. 1, 2010. The disclosures of such international patent application and Chinese priority patent application are hereby incorporated herein by reference in their respective entireties, for all purposes.

FIELD OF THE INVENTION

The present invention relates to a catalyst, specifically to a cerium-based mixed oxide catalyst for catalytic abatement of nitrogen oxides, more particularly, to a cerium-based mixed oxide catalyst for catalytic abatement of nitrogen oxides from mobile sources represented by diesel vehicle exhaust and stationary sources represented by flue gas of coal-fired power plants.

BACKGROUND

Currently, fossil fuels, such as coal and oil fuels, are the main energy sources world widely. Besides sulfur oxides ($SO_x$), nitrogen oxides ($NO_x$, particularly NO and $NO_2$) are included in the flue gas generated by coal combustion. There is also a high proportion of $NO_x$ in the flue gas of oil fuels combustion, such as motor gasoline and motor diesel.

Presence of $NO_x$ leads to a variety of serious environmental problems, such as photochemical smog, acid rain, greenhouse effect and damage of ozonosphere, etc. Meanwhile, $NO_x$ has bio-respiration toxicity, and is harmful to environment and human health.

With the shortage of petroleum resources and increasing pressure on reducing carbon dioxide emissions, diesel vehicles attract more and more attention due to its good fuel economy and drivability. Comparing with gasoline vehicles with three-way catalysts, exhaust pollution characterized by $NO_x$ and PM becomes the bottleneck in the development of diesel vehicles. Diesel vehicles have became the main resource of $NO_x$ and PM emissions from motor vehicles in China, and the key problem and difficulty in treating vehicle exhaust. The exhaust from diesel vehicles is characterized with low temperature, high oxygen, a large amount of particles and a little sulfur, etc, which makes purification and removal difficult.

At present, the main techniques for purifying $NO_x$ in diesel vehicles exhaust include direct decomposition of NO, $NO_x$ storage-reduction (NSR), hydrogen carbons selective catalytic reduction of $NO_x$ (HC-SCR), and $NH_3$ selective catalytic reduction of $NO_x$ ($NH_3$-SCR).

NO direct catalytic decomposition technique was emerged in last century, had once been thought as the most ideal method to remove lean-burn $NO_x$. Theoretically, NO is thermally unstable, but its activation energy of decomposition reaction can reach 364 kJ/mol. To promote the reaction, appropriate catalysts should be chosen to reduce the activation energy barrier. Existing researches have shown that many catalysts, such as noble metals, metal oxides, zeolites, etc, can promote the decomposition of NO. But the presence of oxygen may inhibit NO decomposition reaction, and oxygen desorption is the limit step of the whole process. Accordingly, it is very difficult to apply NO direct catalytic decomposition technique in practice for treating lean-burn exhaust.

NSR technique is based on excellent capability of three-way catalysts for removing HC and $NO_x$ simultaneously, and cooperating with the $NO_x$ adsorbent to trap $NO_x$ in the lean phase; achieving the aim of removing HC and $NO_x$ simultaneously by regulating the engine to the rich phase periodically and reducing $NO_x$ by HC in the exhaust. However, for the implementation of this technique, engine condition should be controlled precisely, and lean and rich conditions should be operated alternatively, to make the catalyst exhibit the best $NO_x$ removal efficiency, which increases the difficulty for controlling the engine; at the same time, operating at rich condition increases fuel consumption, and reduces the fuel economy of diesel engine; additionally, the sensitivity of NSR catalysts to sulfur limits its application.

HC-SCR selectively catalyzes the reduction of $NO_x$ with hydrocarbons. Generally, alkanes and alkenes are used to reduce $NO_x$ on catalysts with high selectivity. The catalysts may be divided into 3 categories: (1) metal ion-exchanged molecular sieve catalysts, including ZSM series, ferrierite, mordenite, silicon aluminum phosphate molecular sieve (SAPO), Y-type zeolites, L-type zeolites, etc; (2) non-noble metal oxide catalysts, including loaded metal oxide catalysts with a carrier, such as $Al_2O_3$, $SiO_2$, $TiO_2$, $ZrO_2$, and so on, bimetallic catalysts comprising of $Al_2O_3$, $SiO_2$, $TiO_2$, $ZrO_2$, $Cr_2O_3$, $Fe_2O_3$, $CO_3O_4$, CuO, $V_2O_5$, $Bi_2O_3$, MgO, and so on, rare earth perovskite mixed oxides, such as $LaAlO_3$; (3) noble metal catalysts, such as Pt, Pd, Rh, Au, and so on, in atom type, or exchanged on zeolites, or loaded on $Al_2O_3$, $SiO_2$, $TiO_2$, $ZrO_2$. Catalysts used in the HC-SCR method need carriers to disperse catalytic active components and increase the specific surface area, which make the catalysts with carrier have larger specific surface area with the same active components. Thus, the catalysts need large space when the method is applied in limited fields such as diesel vehicles.

$NH_3$-SCR is thought to be the most promising technology that can be applied widely to purify exhaust gases of diesel vehicles. At present, this technology has been taken into practice, which is the most world-widely used flue gas $deNO_x$ technology. Generally, $NH_3$-SCR catalysts used in industry are $V_2O_5$-$WO_3$ ($MoO_3$)/$TiO_2$ catalysts containing toxic vanadium (V). The catalysts not only need carriers, but also V may be detached and enter into environment, when the active components are working. $V^{5+}$ pollutes the environment, and further is harmful to humans, for its high bio-toxicity. Accordingly, the usage of $V^{5+}$ is limited in Europe and America. At the same time, this catalyst system has disadvantages such as narrow operation temperature range, being prone to catalyze $SO_2$ in flue gas to $SO_3$, and so on.

Therefore, it is very environmentally important for developing novel nontoxic vanadium-free catalyst system with high $NH_3$-SCR activity, broad operation temperature range, suitable for high space velocity conditions, which catalyze and remove nitrogen oxides from mobile sources represented by diesel engine exhaust gases and stationary sources represented by flue gas of coal-fired power plants.

DESCRIPTION OF THE INVENTION

Aiming at the limitations in the prior art, in order to overcome disadvantages of metal oxide catalyst system in the prior art such as narrow operation temperature range, poor activity at low temperature, low $N_2$ selectivity, susceptibility to reaction space velocity, etc, the invention provides a novel cerium-based mixed oxide catalyst and the preparing method for the first time, which can be used for catalytic abatement of $NO_x$ from mobile sources represented by diesel vehicle exhaust gases and stationary sources represented by flue gas from coal-fired power plants. Preferably, the present invention is used for catalytic abatement of $NO_x$ from diesel vehicle exhaust gases.

Accordingly, one object of the present invention is to provide a cerium-based mixed oxide catalyst for catalytic abatement of nitrogen oxides.

The catalyst is a mixed oxide catalyst, and could achieve appropriate dispersing and catalyzing effect with no carrier.

The mixed oxide catalyst includes cerium (Ce) and at least one metal selected from transition metals, the transition metals including: scandium (Sc), titanium (Ti), vanadium (V), chromium (Cr), manganese (Mn), ferrum (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), aurum (Au).

Preferably, the transition metal is selected from anyone of tungsten (W), molybdenum (Mo), ferrum (Fe) or mixture of two or more of them. Examples of mixture are W/Mo, W/Fe, Mo/Fe and W/Mo/Fe.

The mole ratio of cerium (Ce) to transition metal may be 0.2-5.0, preferably, 0.5-4.5, such as 1.0-4.0, 1.5-3.5, 2.0-3.0, and so on.

Cerium and the transition metal in the mixed oxide catalyst both exist as oxides. In the present invention, it is found that oxides of cerium and the transition metal are in the form of solid solution in the mixed oxide catalyst.

The oxide of Ce is $CeO_x$, and is the mixture of oxides of Ce with different valence, for example, mixture of $Ce^{3+}$ and $Ce^{4+}$.

The transition metal oxide is a mixture of oxides with different valence states. The transition metal oxide, for example $WO_x$, is a mixture of W oxides with different valence, for example, mixture of $W^{5+}$ and $W^{6+}$; $MoO_x$ is a mixture of Mo oxides with different valence, for example, mixture of $Mo^{5+}$ and $Mo^{6+}$; $FeO_x$ is a mixture of Fe oxides with different valence, for example, mixture of $Fe^{2+}$ and $Fe^{3+}$.

Preferably, the mixed oxides catalyst is bimetallic mixed oxides of $CeO_x$—$WO_x$, $CeO_x$—$MoO_x$, $CeO_x$—$FeO_x$, or mixed oxide catalyst of $CeO_x$—$WO_x$—$MoO_x$, $CeO_x$—$WO_x$—$FeO_x$, $CeO_x$—$MoO_x$—$FeO_x$, or mixed oxide catalyst of $CeO_x$—$WO_x$—$MoO_x$—$FeO_x$.

Another object of the present invention is to provide a preparation method of cerium-based mixed oxide catalyst. The preparation method of the cerium-based mixed oxide catalyst in the present invention may be homogenous precipitation method, sol-gel method, citric acid complexing method, hydrothermal synthesis method, etc.

I. Homogenous Precipitation Method

The precipitation method is preferably homogenous precipitation method, which includes following steps:

(1) Preparing a mixture solution of salts of Ce and a transition metal, the metal molar ratio of Ce to the transition metal is 0.2-0.5 in the mixture solution;

(2) Using excessive urea as a precipitator, 60-100° C., stirring 0.5-48 h;

(3) obtaining filter cakes after filtering and washing;

(4) drying the filter cakes, and calcinating it at 400-800° C. at atmosphere, obtaining the cerium-based mixed oxide catalyst.

Preferably, in step (1), the cerium salt is at least one of cerium(III) chloride, cerium nitrate, cerium ammonium nitrate, cerium sulfate, or mixture of two or more of them.

Preferably, in step (1), the transition metal salt includes at least one of tungsten salt or tungstate, molybdenum salt or molybdate, ferrum salt, or mixture of two or more of them; preferably, the tungsten salt or tungstate is at least one of ammonium tungstate, ammonium paratungstate, tungsten nitrate, tungsten chloride, tungsten sulfate, or mixture of two or more of them; preferably, the molybdenum salt or molybdate is at least one of ammonium molybdate, ammonium dimolybdate, ammonium molybdate tetrahydrate, molybdenum nitrate, molybdenum chloride, molybdenum sulfate, or mixture of two or more of them; preferably, the iron salt is at least one of ferric nitrate, tungstate ferrum, molybdate ferrum, ferric chloride, ferric sulfate, or mixture of two or more of them.

Preferably, in step (2), the stirring time is 1-24 h, more preferably is 4-15 h, for example, 5 h, 6 h, 8 h, or 12 h.

Preferably, in step (2), the temperature is 60-100° C., more preferably, 70-98° C., further preferably, 80-95° C.

Preferably, in step (3), washing with de-ionized water, 1-5 times, for example, 2-4 times, including 3 times.

Preferably, in step (4), drying at 80-120° C., more preferably, drying in oven at 80-120° C., preferably, drying time is 1-36 h, more preferably, is 2-24 h, further, 4-12 h.

Preferably, in step (4), calcinating in muffle at 400-800° C. at atmosphere, the calcination time is 1-24 h, preferably, 2-12 h, more preferably, 4-6 h.

There is no special limitation about reaction pressure in the homogenous precipitation method, but generally normal pressure.

II. Sol-Gel Method

The sol-gel method includes following steps:

(1) Preparing a mixture solution of salts of Ce and a transition metal, the metal molar ratio of Ce to the transition metal is 0.2-0.5 in the mixture solution;

(2) Stirring for 0.5-72 h at room temperature, obtaining a sol;

(3) Depositing the sol at normal temperature and air pressure for 0.5-12 d, obtaining a gel;

(4) Drying the gel, and calcinating it at 400-800° C. at atmosphere, and obtaining the cerium-based mixed oxide catalyst.

Preferably, in step (1), the cerium salt is at least one of cerium(III) chloride, cerium nitrate, cerium ammonium nitrate, cerium sulfate, or mixture of two or more of them.

Preferably, in step (1), the transition metal salt includes at least one of tungsten salt or tungstate, molybdenum salt or molybdate, ferrum salt, or mixture of two or more of them; preferably, the tungsten salt or tungstate is at least one of ammonium tungstate, ammonium paratungstate, tungsten nitrate, tungsten chloride, tungsten sulfate, or mixture of two or more of them; preferably, the molybdenum salt or molybdate is at least one of ammonium molybdate, ammonium dimolybdate, ammonium molybdate tetrahydrate, molybdenum nitrate, molybdenum chloride, molybdenum sulfate, or mixture of two or more of them; preferably, the iron salt is at least one of ferric nitrate, tungstate iron, molybdate iron, ferric chloride, ferric sulfate, or mixture of two or more of them.

Preferably, in step (2), the stirring time is 1-60 h, more preferably is 4-48 h, for example, 6 h, 10 h, 12 h or 24 h, etc.

Preferably, in step (3), the deposition time is 1-10 d, more preferably, 2-7 d, for example 3 d, 4 d, 5 d or 6 d, etc.

Preferably, in step (4), drying at 80-120° C., more preferably, drying in oven at 80-120° C., preferably, drying time is 1-36 h, more preferably, is 2-24 h, further, 4-12 h.

Preferably, in step (4), calcinating in muffle at 400-800° C. at atmosphere, the calcination time is 1-24 h, preferably, 2-12 h, more preferably, 4-6 h.

III. Citric Acid Complexing Method

The citric acid complexing method includes following steps:

(1) Preparing a mixture solution of salts of Ce and a transition metal, the metal molar ratio of Ce to the transition metal is 0.2-0.5 in the mixture solution;

(2) Adding specific amount of citric acid, the molar ratio of total amount of metal ions to citric acid is 0.5-5.0;

(3) Stirring for 0.5-48 h at 20-95° C.;

(4) Being stable at normal temperature and air pressure for 0.5-5 d;

(5) Drying the product, calcinating it at 400-800° C. in air condition, and obtaining the cerium-based mixed oxide catalyst.

Preferably, in step (1), the cerium salt is at least one of cerium(III) chloride, cerium nitrate, cerium ammonium nitrate, cerium sulfate, or mixture of two or more of them.

Preferably, in step (1), the transition metal salt includes at least one of tungsten salt or tungstate, molybdenum salt or molybdate, ferrum salt, or mixture of two or more of them; preferably, the tungsten salt or tungstate is at least one of ammonium tungstate, ammonium paratungstate, tungsten nitrate, tungsten chloride, tungsten sulfate, or mixture of two or more of them; preferably, the molybdenum salt or molybdate is at least one of ammonium molybdate, ammonium dimolybdate, ammonium molybdate tetrahydrate, molybdenum nitrate, molybdenum chloride, molybdenum sulfate, or mixture of two or more of them; preferably, the iron salt is at least one of ferric nitrate, tungstate iron, molybdate iron, ferric chloride, ferric sulfate, or mixture of two or more of them.

Preferably, in step (3), the stirring time is 1-40 h, more preferably is 2-24 h, for example, 3 h, 5 h, 10 h or 20 h, etc.

Preferably, in step (4), being stable for 1-4 d, for example 2 d or 3 d, etc.

Preferably, in step (5), calcinating at 80-120° C., more preferably, calcinating in oven at 80-120° C., preferably, drying time is 1-36 h, more preferably, is 2-24 h, further, 4-12 h.

Preferably, in the step (5), calcinating in muffle at 400-800° C. at atmosphere, the calcination time is 1-24 h, preferably, 2-12 h, more preferably, 4-6 h.

IV. Hydrothermal Synthesis Method

The hydrothermal synthesis method includes following steps:

(1) Preparing a mixture solution of salts of Ce and a transition metal, the metal molar ratio of Ce to the transition metal is 0.2-0.5 in the mixture solution;

(2) After stirring for 0.5-2 h at room temperature, transferring the solution to a stainless-steel autoclave lined by poly(tetrafluoroethylene)

(3) Placing the autoclave at 80-200° C. for 1-12 d;

(4) Centrifuging, washing and drying the product, calcinating it at 400-800° C. at atmosphere, and obtaining the cerium-based mixed oxide catalyst.

Preferably, in step (1), the cerium salt is at least one of cerium(III) chloride, cerium nitrate, cerium ammonium nitrate, cerium sulfate, or mixture of two or more of them.

Preferably, in step (1), the transition metal salt includes at least one of tungsten salt or tungstate, molybdenum salt or molybdate, ferrum salt, or mixture of two or more of them; preferably, the tungsten salt or tungstate is at least one of ammonium tungstate, ammonium paratungstate, tungsten nitrate, tungsten chloride, tungsten sulfate, or mixture of two or more of them; preferably, the molybdenum salt or molybdate is at least one of ammonium molybdate, ammonium dimolybdate, ammonium molybdate tetrahydrate, molybdenum nitrate, molybdenum chloride, molybdenum sulfate, or mixture of two or more of them; preferably, the iron salt is at least one of ferric nitrate, tungstate iron, molybdate iron, ferric chloride, ferric sulfate, or mixture of two or more of them.

Preferably, in step (3), placing for 1-12 d, more preferably, 2-8 d, for example 3 d, 4 d, 5 d or 6 d, etc.

Preferably, in step (4), drying at 80-120° C., more preferably, drying in oven at 80-120° C., preferably, drying time is 1-36 h, more preferably, is 2-24 h, further, 4-12 h.

Preferably, in step (4), calcinating in muffle at 400-800° C. at atmosphere, the calcination time is 1-24 h, preferably, 2-12 h, more preferably, 4-6 h.

Another object of the present invention is to provide a method of catalytic abatement of nitrogen oxide in gas, in which the cerium-based mixed oxide catalyst of the present invention is applied. The catalyst may be made into washcoat slurry according to actual need, then loaded on a monolith honeycomb ceramics carrier to prepare the monolith catalyst for usage, or may be extruded to a suitable shape for usage. The catalyst is placed into the exhaust pipe when being used, and a reducing agent is sprayed upstream of the catalyst to mix with the exhaust. Ammonia or urea (which hydrolyzes into ammonia) can be used as the reductant, the amount of which is 0.8-1.2 times of nitrogen oxides. In oxygen-rich conditions, the reducing agent could reduce $NO_x$ to $N_2$ and $H_2O$ over a broad temperature range, and has a high $N_2$ selectivity and an excellent capability to resist sulfur and water.

Preferably, the gas is from mobile sources containing nitrogen oxides, for example, diesel vehicle exhaust, or from stationary sources containing nitrogen oxides, for example, flue gas from coal-fired power plants.

Preferably, the gas is diesel vehicle exhaust, namely, the method in present invention is especially suitable for catalytic abatement of nitrogen oxides in diesel vehicle exhaust gases.

The present invention has following advantages:

(1) The cerium-based mixed oxide catalyst has a broad operation temperature range (especially with good activity at low temperature), which is suitable for the condition of broad temperature range of vehicles exhaust; with respect to flue gas deNO$_x$ in the stationary sources, it is hopeful for the catalyst to be applied as a low temperature type SCR catalyst after the process of desulfur, to improve the lifespan of SCR catalyst;

(2) The characteristics of being not sensitive to reaction space velocity and being suitable for the high space velocity in vehicle exhaust purification, can reduce the catalyst volume significantly when applying for flue gas deNO$_x$ in the stationary sources, thus reduce cost and save space;

(3) The catalyst has excellent $N_2$ selectivity;

(4) Excellent capacity for resisting high-temperature calcination and preventing from sulfur and water poisoning.

(5) with toxic-free components, effectively reducing the hazard to human health and environment.

EMBODIMENTS

Following examples are provided to understand the present invention. It should be clear to those skilled in the art that, the examples are just intended to help understanding the invention, not to limit the invention.

Example 1

Ammonium tungstate was dissolved in oxalic acid (mass ration of ammonium tungstate: oxalic acid is 1:1), and cerium nitrate was added to this solution, to prepare a solution with the molar ratio of Ce/W=0.5, and mixing well, excessive urea were added, stirring for 12 h continuously at 90° C. After filtration and washing, the filtering cake was dried overnight in oven at 100° C. At last, powder of catalyst was generated after being calcinated in muffle for 5 h at 500° C. at atmosphere.

The catalyst was squashed, meshed and sieved through the mesh. Powder between 40-60 mesh were prepared to be used, called catalyst A.

Example 2

The conditions are the same as Example 1, except the molar ratio of Ce/W is 1.0, to prepare catalyst B.

Example 3

The conditions are the same as Example 1, except the molar ratio of Ce/W is 2.0, to prepare catalyst C.

Example 4 baking catalyst B at 800° C. for 1 h at atmosphere, to prepare catalyst D.

Example 5

The conditions are the same as Example 2, except replacing ammonium tungstate by ammonium molybdate, to prepare catalyst E.

Example 6

The conditions are the same as Example 2, except replacing ammonium tungstate by ferric nitrate, to prepare catalyst F.

Example 7

The $NH_3$ selective catalytic reduction activities of Ce/W mixed oxide catalysts A, B, C and D, Ce/Mo mixed oxide catalysts E, and Ce/Fe mixed oxide catalysts F prepared according to Example 1-6 are tested in a fixed-bed reactor. Catalyst amount used in the reaction was 0.12 mL, the reaction mixture gases consisted of [NO]=[NH$_3$]=500 ppm, [O$_2$]=5%, and balance N$_2$, the total flow rate was 500 mL/min space velocity was 250,000 h$^{-1}$. The reaction was carried out at 150-450° C. NO, NH$_3$ and byproducts N$_2$O, NO$_2$ were all analyzed by an online FTIR spectrometer equipped with a gas cell. The results are shown in Table 1.

TABLE 1

The catalytic activities of Ce-W catalysts with different Ce/W molar ratio and calcination temperature and Ce-Mo and Ce-Fe catalysts

| | NO$_x$ Conversion rate at different temperature (%) | | | | | | |
|---|---|---|---|---|---|---|---|
| ID | 150° C. | 200° C. | 250° C. | 300° C. | 350° C. | 400° C. | 450° C. |
| A | 9.0 | 13.8 | 27.1 | 39.6 | 45.4 | 31.3 | 2.5 |
| B | 15.0 | 80.7 | 99.2 | 99.2 | 99.1 | 98.0 | 91.4 |
| C | 12.9 | 63.7 | 100.0 | 99.9 | 99.4 | 97.0 | 76.4 |
| D | 8.8 | 25.1 | 77.0 | 97.1 | 98.9 | 95.0 | 86.0 |
| E | 3.6 | 18.1 | 69.0 | 88.4 | 90.0 | 76.1 | 40.8 |
| F | 3.1 | 13.7 | 45.7 | 69.6 | 40.1 | — | — |

As shown in Table 1, the NO$_x$ conversion of catalyst B was significantly higher than catalyst E and F. At a space velocity of 250,000 h$^{-1}$, in a temperature range of 200~450° C., catalyst B achieved more than 80% of NO$_x$ conversion, and had more than 97% N$_2$ selectivity.

After being calcinated at 800° C., catalyst D can still achieve more than 80% of NO$_x$ conversion, and had more than 98% N$_2$ selectivity at a space velocity of 250,000 h$^{-1}$, in a temperature range of 200-450° C., which means that the catalyst has an excellent capability of resisting calcination at high temperature.

Example 8

The effect of space velocity on catalytic activity using catalyst B is tested in a fixed-bed reactor.

Catalyst volumes used in the reaction were 0.3 mL, 0.12 mL, 0.06 mL, respectively. The reaction mixture gases consisted of [NO]=[NH$_3$]=500 ppm. [O$_2$]=5%, and balance N$_2$, the total flow rate was 500 mL/min, space velocity were 100,000 h$^{-1}$, 250,000 h$^{-1}$, 500,000 h$^{-1}$. The reaction was carried out at 150-450° C. NO, NH$_3$ and byproducts N$_2$O, NO$_2$ were all analyzed by an online FTIR spectrometer equipped with a gas cell. The results are shown in Table 2.

TABLE 2

The effect of space velocity on the activity of catalyst B

| space velocity | NO$_x$ conversion at different temperature ( % ) | | | | | | |
|---|---|---|---|---|---|---|---|
| ( h$^{-1}$ ) | 150° C. | 200° C. | 250° C. | 300° C. | 350° C. | 400° C. | 450° C. |
| 100,000 | 31.5 | 99.4 | 99.3 | 99.7 | 99.9 | 100 | 98.4 |
| 250,000 | 15.0 | 80.7 | 99.2 | 99.2 | 99.1 | 98.0 | 91.4 |
| 500,000 | 11.7 | 54.1 | 97.9 | 98.6 | 97.9 | 97.9 | 93.4 |

At a space velocity of 100,000 h$^{-1}$, a temperature range of 200-50° C., catalyst B can achieve more than 90% of NO$_x$ conversion, and had more than 98% N$_2$ selectivity, showing a very broad operation temperature range.

Even at a space velocity of 500,000 h$^{-1}$, in a temperature range of 200-450° C., catalyst B can still achieve more than 90% of NO$_x$ conversion, and had more than 98% N$_2$ selectivity, which means that catalyst B has an excellent reaction capability to resist high space velocity.

Example 9

The effect of SO$_2$ on the catalytic activity of catalyst B is tested on a fixed-bed reactor. Catalyst volume used in the reaction was 0.12 mL, the reaction mixture gases consisted of [NO]=[NH$_3$]=500 ppm, [O$_2$]=5%, [SO$_2$]=100 ppm, and balance N$_2$, the total flow rate was 500 mL/min, space velocity was 250,000 h$^{-1}$. The reaction was carried out at 150-450° C. NO, NH$_3$ and byproducts N$_2$O, NO$_2$ were all analyzed by an online FTIR spectrometer equipped with a gas cell. The results showed that the catalyst had good SO$_2$ poisoning-resistance, and the NO$_x$ conversion keeps at 100% during the testing time of 24 h.

The applicant declares that the embodiments described above are intended to illustrate the detailed equipments and processes, which do not mean that the implement of the present invention must rely on the equipments and processes described above. It will be apparent to those skilled in the art that any improvements on the present invention, equal-effective replacements of materials, and additions of assistant components and selections of the specific method all come within the scope of the present invention.

The invention claimed is:

1. A cerium-based mixed oxide catalyst for catalytic abatement of nitrogen oxides, characterized in that the catalyst consists of a cerium oxide and at least one other metal oxide, wherein the metal in the at least one other metal oxide is a transition metal selected from the group consisting of molybdenum (Mo), tungsten (W), and mixtures thereof,
   wherein the oxides of cerium (Ce) and the transition metal form a solid solution in the mixed oxide catalyst;
   and wherein the molar ratio of cerium (Ce) to the transition metal is 1-2.0.

2. The catalyst according to claim 1, wherein the mixture of metals is W/Mo.

3. The catalyst according to claim 1, wherein the cerium-based mixed oxide catalyst is selected from the group consisting of $CeO_x$—$WO_x$ and $CeO_x$—$MoO_x$.

4. A method for preparing the cerium-based mixed oxide catalyst according to claim 1, wherein said preparation method is a homogenous precipitation method, sol-gel method, citric acid complexing method or hydrothermal synthesis method.

5. The method of claim 4, wherein the homogenous precipitation method comprises the following steps:
   (a) preparing a mixture solution consisting of a solvent and salts of Ce and a transition metal, the metal molar ratio of Ce to the transition metal is 1-2.0 in the mixture solution;
   (b) using excessive urea as a precipitator, and stirring for 0.5-48 h at 60-100° C. to form a precipitate,
   (c) filtering and washing the reaction mixture to obtaining a filter cake;
   (d) drying the filter cake, and
   (e) calcinating the filter cake at 400-800° C. at atmospheric pressure, to obtain the cerium-based mixed oxide catalyst, wherein the transition metal is selected from the group consisting of molybdenum (Mo), tungsten (W), and mixtures thereof.

6. The method of claim 5, wherein the cerium salt comprises cerium(III) chloride, cerium nitrate, cerium ammonium nitrate, cerium sulfate, or mixture thereof,
   the transition metal salt comprises at least one of tungsten salt or tungstate, molybdenum salt or molybdate, or mixture of two or more of them,
   the tungsten salt or tungstate is at least one of ammonium tungstate, ammonium paratungstate, tungsten nitrate, tungsten chloride, tungsten sulfate, or a mixture of two or more of them, or
   the molybdenum salt or molybdate is at least one of ammonium molybdate, ammonium dimolybdate, ammonium molybdate tetrahydrate, molybdenum nitrate, molybdenum chloride, molybdenum sulfate, or a mixture of two or more of them.

7. The method of claim 4, wherein the sol-gel method includes the following steps:
   (a) preparing a mixture solution consisting of a solvent and salts of Ce and a transition metal, the metal molar ratio of Ce to the transition metal is 1-2.0 in the mixture solution;
   (b) stirring for 0.5-72 h at room temperature, obtaining a sol;
   (c) depositing the sol at normal temperature and normal air pressure for 0.5-12 d, get a gel;
   (d) drying the gel, and
   (e) calcinating the gel at 400-800° C. at atmospheric pressure, to obtain the cerium-based mixed oxide catalyst, wherein the transition metal is selected from the group consisting of molybdenum (Mo), tungsten (W), and mixtures thereof.

8. The method of claim 7, wherein:
   a) the cerium salt is at least one of cerium(III) chloride, cerium nitrate, cerium ammonium nitrate, cerium sulfate, or mixture of two or more of them,
   b) the transition metal salt includes at least one of tungsten salt or tungstate, molybdenum salt or molybdate, or mixture of two or more of them;
   c) the tungsten salt or tungstate is at least one of ammonium tungstate, ammonium paratungstate, tungsten nitrate, tungsten chloride, tungsten sulfate, or mixture of two or more of them; or
   d) the molybdenum salt or molybdate is at least one of ammonium molybdate, ammonium dimolybdate, ammonium molybdate tetrahydrate, molybdenum nitrate, molybdenum chloride, molybdenum sulfate, or mixture of two or more of them.

9. The method of claim 4, wherein the citric acid complexing method comprises the following steps:
   (a) preparing a mixture solution consisting of a solvent and salts of Ce and a transition metal, the metal molar ratio of Ce to transition metal is 1-2.0 in the mixture solution;
   (b) adding a specific amount of citric acid, the molar ratio of total amount of metal ions to citric acid is 0.5-5.0;
   (c) stirring for 0.5-48 h at 20-95° C.;
   (d) depositing at normal temperature and air pressure for 0.5-5 d;
   (e) drying the product, and
   (f) calcinating the product at 400-800° C. at atmospheric pressure, to obtain the cerium-based mixed oxide catalyst, wherein the transition metal is selected from the group consisting of molybdenum (Mo), tungsten (W), and mixtures thereof.

10. The method of claim 9, wherein in step (a):
   the cerium salt is at least one of cerium(III) chloride, cerium nitrate, cerium ammonium nitrate, cerium sulfate, or mixture of two or more of them, or
   the transition metal salt includes at least one of tungsten salt or tungstate, molybdenum salt or molybdate, or mixture of two or more of them;
   the tungsten salt or tungstate is at least one of ammonium tungstate, ammonium paratungstate, tungsten nitrate, tungsten chloride, tungsten sulfate, or mixture of two or more of them;
   the molybdenum salt or molybdate is at least one of ammonium molybdate, ammonium dimolybdate, ammonium molybdate tetrahydrate, molybdenum nitrate, molybdenum chloride, molybdenum sulfate, or mixture of two or more of them.

11. The method of claim 4, wherein the hydrothermal synthesis method includes the following steps:
   (a) preparing a mixture solution consisting of a solvent and salts of Ce and a transition metal, wherein the metal molar ratio of Ce to transition metal is 1-2.0 in the mixture solution;
   (b) after stirring for 0.5-2 h at room temperature, transferring the solution to a stainless-steel autoclave lined with poly(tetrafluoroethylene);
   (c) placing the autoclave at 80-200° C. for 1-12 d;

(d) centrifuging the mixture solution to yield a product, which is then washed and dried, and (e) calcinating the product at 400-800° C. in air, to obtain the cerium-based mixed oxide catalyst, wherein the transition metal is selected from the group consisting of molybdenum (Mo), tungsten (W), and mixtures thereof.

12. The method of claim 11, wherein in step (a):

the cerium salt is at least one of cerium(III) chloride, cerium nitrate, cerium ammonium nitrate, cerium sulfate, or mixture of two or more of them, the transition metal salt includes at least one of tungsten salt or tungstate, molybdenum salt or molybdate, or mixture of two or more of them;

the tungsten salt or tungstate includes at least one of ammonium tungstate, ammonium paratungstate, tungsten nitrate, tungsten chloride, tungsten sulfate, or mixture of two or more of them, or the molybdenum salt or molybdate includes at least one of ammonium molybdate, ammonium dimolybdate, ammonium molybdate tetrahydrate, molybdenum nitrate, molybdenum chloride, molybdenum sulfate, or mixture of two or more of them.

13. A method for catalytic abatement of nitrogen oxide in gases, comprising exposing the gases to the cerium-based mixed oxide catalyst of claim 1.

14. The method according to claim 13, wherein the catalyst is either:

a) made into a washcoat slurry, then loaded on a monolith honeycomb ceramics carrier to prepare monolith catalyst for usage, or b) extruded onto a monolith for usage.

15. The method of claim 13, wherein the catalyst is placed within an exhaust pipe when being used, and a reducing agent is sprayed upstream of the catalyst to mix with the exhaust fumes before being exposed to the catalyst, wherein ammonia or urea is used as the reducing agent, the amount of which is 0.8-1.2 times that of the nitrogen oxides in the gases.

16. The method of claim 13, wherein the gas is from a mobile source containing nitrogen oxide gas or from a stationary source containing nitrogen oxide gas.

\* \* \* \* \*